(12) United States Patent
Yasue et al.

(10) Patent No.: US 6,979,384 B2
(45) Date of Patent: Dec. 27, 2005

(54) METHOD AND SYSTEM FOR REMOVING METAL WIRES IN TIRE THROUGH INDUCTION HEATING

(75) Inventors: Kazuo Yasue, Aichi (JP); Yasuo Yamada, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/479,984

(22) PCT Filed: Mar. 19, 2002

(86) PCT No.: PCT/JP02/02574

§ 371 (c)(1),
(2), (4) Date: Dec. 15, 2003

(87) PCT Pub. No.: WO02/102563

PCT Pub. Date: Dec. 27, 2002

(65) Prior Publication Data

US 2004/0168763 A1    Sep. 2, 2004

(30) Foreign Application Priority Data

Jun. 15, 2001  (JP) .............................. 2001-182547

(51) Int. Cl.⁷ ............................................. B32B 35/00
(52) U.S. Cl. .................... 156/344; 156/584; 29/403.04
(58) Field of Search ........................... 156/273.9, 344, 156/584; 264/37.1, 37.3; 29/403.4

(56) References Cited

U.S. PATENT DOCUMENTS

| | | | | |
|---|---|---|---|---|
| 1,329,239 A | * | 1/1920 | Hafner | 156/584 |
| 1,459,693 A | * | 6/1923 | Rand et al. | 156/344 |
| 1,869,680 A | * | 8/1932 | Freeman | 156/344 |
| 2,291,862 A | * | 8/1942 | Bailey | 156/344 |
| 2,636,408 A | * | 4/1953 | Mitchell | 29/867 |
| 5,226,999 A | * | 7/1993 | Dugas | 156/344 |
| 5,250,131 A | * | 10/1993 | Gitelman | 156/95 |
| 5,290,380 A | * | 3/1994 | Gitelman et al. | 156/344 |
| 5,683,038 A | | 11/1997 | Shinal | |
| 5,783,035 A | * | 7/1998 | Pederson | 156/584 |

FOREIGN PATENT DOCUMENTS

| | | |
|---|---|---|
| JP | 49-86988 | 8/1974 |
| JP | 52-114681 | 9/1977 |
| JP | 59-192548 | 10/1984 |
| JP | 60-203411 | 10/1985 |
| JP | 61-22613 | 2/1986 |

(Continued)

*Primary Examiner*—Mark A. Osele
(74) *Attorney, Agent, or Firm*—Oblon, Spivak, McClelland, Maier & Neustadt, P.C.

(57) ABSTRACT

The present invention provides a method of removing metal wires from a tire through induction heating, a method of collecting the metal wires and rubber part, and a method of reusing the metal wires and rubber part. The present invention relates to: a metal wire removal method for removing metal wires from a tire incorporated with metal wires using induction heating, wherein the metal wires in the tire are heated by induction heating, causing the rubber in the part contacting the metal wires to decompose and gasify to separate the metal wires and rubber part, whereupon the metal wires are removed; a method of collecting the metal wires and rubber part from the tire using the method described above; and a method of reusing the metal wires and rubber part collected using the method described above as metal and rubber resources. Thus the metal wires and rubber part can be separated from a used tire, collected at a high collection rate, and reused.

18 Claims, 14 Drawing Sheets

FOREIGN PATENT DOCUMENTS

| | | |
|---|---|---|
| JP | 7-299820 | 11/1995 |
| JP | 7-308923 | 11/1995 |

* cited by examiner

METHOD AND SYSTEM FOR REMOVING METAL WIRES IN TIRE THROUGH INDUCTION HEATING

BACKGROUND OF THE INVENTION

1. Field of the Invention

The present invention relates to a method of removing metal wires from a tire using dielectric heating, a method of collecting the metal wires and rubber part of the tire, and a method of reusing the tire used in these methods. More specifically, the present invention relates to a method in which the metal wires in a tire are heated using electromagnetic induction, whereby the characteristic of the rubber of the part contacting the metal wires alters to separate the metal wires and rubber part, and thus the metal wires arranged in the tire are separated, collected, and reused. In particular, the present invention relates to a technique for recycling an automobile tire.

2. Description of the Related Art

Although the recycling rate for used automobile tires is much higher than that of other industrial products, the amount of discarded tires continues to increase from year to year, creating an increasingly serious social problem. Among the most sophisticated methods of reusing used tires are a method in which new rubber is adhered to the worn-down parts of a used tire so that the tire can be reused, and a method in which a used tire is cut or shredded into small pieces and used as a mat, pavement material, reclaimed rubber, footwear, and so on. As shown in FIG. 1, however, in almost all cases steel wires 4 are arranged within and incorporated into a bead portion 1 and a tread portion 3 of the tire. Since it is difficult to remove these steel wires cheaply using current technology, the tire cannot be cut or shredded into small pieces. Accordingly, only a sidewall part 2 in which no steel wires are incorporated can be cut or shredded and reused. Further, the sidewall portion constitutes less than 30% of the entire tire. The parts incorporated with steel wires, or in other words the remaining 70%, are used as fuel for cement firing or metal smelting, for example.

However, when used tires are used as fuel, a desulfurizer is required, and furthermore, the burned steel wires cause a large increase in the amount of ash, which is a problem in terms of industrial waste processing. Moreover, in terms of demand, there is a limit to the amount of used tires that can be used as fuel.

When the parts of a tire incorporated with steel wires are cut, shearing is performed using only a cutter, but when soft rubber and tough steel wires must be severed simultaneously, problems arise in that the life of the cutter is shortened, and in that it is technically difficult to sever anything with a magnitude of fifteen square centimeters or less. It goes without saying that if the steel wire-incorporated parts serving as fuel could also be cut into small pieces, combustion efficiency would rise, and benefits would be gained regarding transportation.

Hence if the steel wire in a used tire could be removed, the field of recycling applications could be extended beyond fuel, the use of used tires as fuel would increase in value, and benefits would be gained regarding transportation and storage. Further, if the metal wires could be collected, they could also be recycled into metal.

In light of this situation, the present inventors considered the background art described above and performed various investigations with the object of developing a new method of removing metal wires in which the steel wires in a used tire can be separated and collected efficiently and by a simple operation. As a result of these investigations, it was discovered that by heating the metal wires in the tire using induction heating, the rubber of the part which contacts the metal wires is decomposed and gasified, whereby the metal wires and rubber part can be easily separated and collected. Thus the present invention reached completion.

SUMMARY OF THE INVENTION

An object of the present invention is to provide a method of separating and collecting metal wires from a tire using electromagnetic induction heating.

A further object of the present invention is to provide a method of collecting the metal wires and rubber part of a tire using the method described above, and a method of reusing the metal wires and rubber part collected using the method described above as metal and rubber resources.

The present invention will now be described in further detail.

In the present invention, a metal wire-incorporated tire in which metal wires such as steel wires are arranged and incorporated throughout the tire, and more particularly an automobile tire, is used as a subject, although there are no particular limitations on the type of tire. In the present invention, the metal wires are removed from the metal wire-incorporated tire using induction heating. In this case, a method of implementing induction heating in which the tire is cut in advance into a plurality of parts comprising parts having metal wires and parts not having metal wires is preferably employed. The tire is preferably cut into a bead portion, a sidewall portion, and a tread portion, but there are no particular limitations on the parts to be cut.

Next, a first aspect of the present invention will be described.

First, as shown in FIG. 2, a tire is cut into a bead portion 1, a sidewall portion 2, and a tread portion 3 using a cutter. Here, the part of the tire to be used in the removal of the steel wires 4 is the tread portion. As shown in FIG. 3, the steel wires are arranged in two lines in the tread portion. A high frequency coil 5 is disposed on the outside of the tread portion of the severed tire, and thus the steel wires are heated by induction heating.

As shown in FIG. 4, by heating the steel wire part, the rubber contacting the steel wires is decomposed and gasified, and thus the steel wires and rubber part are separated to form a gap 6. By continuing to apply heat, this gap connects with adjacent gaps, as shown in FIG. 5, such that the rubber and steel wires are completely separated around the steel wire array. Further, gas pressure causes the inside of the tire, where the rubber is thin, to dilate into balloon form.

Steel wires and rubber can be separated according to the principle described above, and hence, by rotating the tread portion on the circumference under the high frequency coil, for example, the steel wires in the tire can be completely separated from the rubber part by a simple operation.

Next, by cutting into a section of the dilated balloon-form part on the inside of the tire, which is obtained according to the aforementioned procedure, and extracting the steel wires, complete separation of the steel wires is possible. By means of such a method, the steel wires can be removed easily from the tire.

By separating the metal wires and rubber part of the tire using the method described above, and collecting these components, the metal wires and rubber part of the tire can be collected at a high collection rate, and furthermore, the collected metal wires and rubber part can be reused and recycled as metal and rubber resources, high value added fuel, and so on.

Next, a second aspect of the present invention will be described.

First, the tire is cut along the circumferential direction thereof using cutting means such as a cutter, and thereby divided into the tread portion and a part comprising the bead portion. In this case, the tire is preferably divided into three parts, the tread portion, the sidewall portion, and the bead portion. In this example, the part in question is the part comprising the bead portion, or in other words the sidewall portion and bead portion. This part has a substantially disk-form shape with a large hole in the center. As long as the part comprising the bead portion can be separated from the tire, this dividing operation may be performed as desired, and the cutting position need only be rough. It goes without saying that the dividing operation may be performed using means which cut by shearing or the like rather than a cutter. Next, as shown in FIG. 8, for example, the disk form sidewall portion and bead portion are placed on fixing means, for example a disk 7 which rotates on a horizontal plane, and fixed to the rotary disk by a clamp 8.

In this case, a method of fixing the end portion of the sidewall portion, such as that shown in FIG. 8, for example, is preferably provided, but the present invention is not limited to the example shown in FIG. 8. The fixing means are not limited to the rotary disk described above, and as long as a similar function is exhibited, there are no particular limitations on the type of fixing means. Further, instead of the clamp described above, other means such as an automatic clamp operated by oil pressure or the like may be used, for example. When the sidewall portion and bead portion are fixed (clamped), a high frequency coil 9 is brought near to the bead portion as shown in FIG. 8, for example, and while the rotary disk is rotated slowly, for example, the bead wires are subjected to induction heating by the high frequency coil. In this case, the bead wires are preferably subjected to induction heating under conditions of 100 to 200° C., whereby the rubber contacting the bead wires decomposes, the air contained inside the rubber expands, and thus the rubber and wires are separated such that a gap forms around the bead wires, as shown in FIG. 9.

Next, when the rotary disk has made one revolution, for example, such that the bead wires are completely separated from the rubber, the high frequency coil is removed and, as shown in FIG. 9, latching means 10 having a forked hook, for example, are preferably hung down from above the tire such that the hook is inserted below the tire disk. A hook with a sharply pointed distal end is preferably used. Next, the hook is moved upward such that the distal end of the hook pierces the bead portion or the sidewall portion near the bead portion. The hook is then moved further upward such that the hook contacts the bead wires. In this case, the end of the sidewall portion is fixed to the rotary disk, and thus by continuing to move the hook upward, the rubber portion covering the bead portion is cut into and torn away such that only the bead wires are picked up by the hook. The latching means having the hook described above are provided as a favorable example of the aforementioned latching means, but the latching means are not limited thereto, and any means that are capable of functioning similarly to cut away the rubber covering the bead portion, separate the bead wires from the bead portion, and collect the bead wires may be used in similar fashion.

Next, a third aspect of the present invention will be described.

The subject of this example is the separation of the steel wires in the tread portion of the tire. Separation of the steel wires in the tread portion preferably begins with the division of the tire into three parts, the tread portion, sidewall portion, and bead portion, around the circumferential direction of the tire. The tread portion severed in this process takes a cylindrical ring form. In the present invention, the outside of this cylindrical ring will be referred to as an outer ground-contacting face 17, and the inside will be referred to as an inner face 18. The method of dividing the tire is not limited to the method described above, and any appropriate method for separating the part comprising the tread portion may be used.

Next, as shown in FIG. 10, the cylindrical ring-form tread portion 11 is inverted such that the inner face 18 is turned outward and the outer ground-contacting face 17 is turned inward. The inverted, inside-out tread portion 11 is preferably fixed by being positioned on the outside of a large and small pair of rollers, as shown in FIG. 10. Here, the large roller is directly connected to a driving mechanism such as a motor, and thus can be rotationally driven. This roller will be referred to as a driven roller 15. The small roller does not comprise a driving mechanism, but does comprise a mechanism enabling the small roller to move left and right. This roller will be referred to as a moving roller 16. These constitutions are merely preferred examples, and the present invention is not limited thereto.

Next, as shown in FIG. 11, the moving roller is moved in the rightward direction in the drawing so as to gently pull the cylindrical ring-form tread portion. When the tread portion has been pulled further such that a state of tension is maintained, the driven roller is caused to rotate slowly as shown in FIG. 12. Next, a high frequency induction coil 19 is brought near to the rotating tread portion, whereby the steel wires buried in the tread portion are heated. In this case, an induction hardening device with a frequency of at least 50 kHz and an output level of several tens of KW is used as the induction heating device. The present invention is not limited thereto, however, and any device which exhibits an equally effective induction heating performance may be used in similar fashion. Further, the shape of the heating coil is not limited. An appropriate method is employed as a method of heating the tread portion using the high frequency induction coil described above, for example a method in which the high frequency induction coil is fixed and the rotating tread portion is brought close, a method in which the tread portion is fixed to fixing means and the high frequency induction coil is brought close, or similar. However, there are no particular limitations on the method. The rubber which contacts the heated steel wires is decomposed and gasified, and the heating produces a part 20 which is dilated into balloon form. A gap produced by the gasification of the rubber coalesces with the respective gaps produced around adjacent steel wires and swells into balloon form, thereby creating a cavity 21 as shown in FIG. 13. As a result, the rubber and the steel wires 14 of the tread portion 11 are separated.

Next, as shown in FIG. 14, when the tread portion has been heated over a single revolution in the circumferential direction thereof such that the inner face of the tread portion is dilated into balloon form, a cutter 22 attached to a cutter holder 23 is brought into contact with the tread portion such that the balloon portion is cut open and then cut away. As shown in FIG. 15, the cutter 22 is preferably formed with cutters 22 on both sides of the cutter holder so as to be capable of cutting open both ends of the swollen inner face part of the tread portion simultaneously. In this case, there are no particular limitations on the number, formation position, and so on of the cutters. Next, the inner face part that is cut away by the operation described above is removed, thus enabling the steel wires to be removed easily. Next, by sweeping the surface of the inner face part using appropriate means such as a brush, the steel wires can be easily separated from the tire. These constitutions are merely preferred examples, and the present invention is not limited thereto. Appropriate design modifications may be implemented.

DESCRIPTION OF THE PREFERRED EMBODIMENTS

Next, the present invention will be described more specifically on the basis of examples, although the present invention is in no way limited to or by these examples.

EXAMPLE 1

(1) Method

A tire was severed into a bead portion, a sidewall portion, and a tread portion, and the severed tread portion was subjected to induction heating using an induction hardening device with a frequency of 50 kHz and a maximum output of 30 kW. The high frequency output at this time was several kilowatts. The employed coil was a two winding flat induction hardening coil with a wire diameter $\phi$ of 8 mm and a coil diameter $\phi$ of 100 mm. The tread was then rotated directly beneath the heating coil at a circumferential velocity of 100 m/sec.

The induction heating caused the rubber of the part contacting the metal wires to decompose and gasify, whereby the metal wires and rubber part were separated. The part which dilated into balloon form due to the decomposition and gasification of the rubber was cut away, the metal wires and rubber part were extracted, and thus the metal wires and rubber part were separated and collected.

(2) Result

Figure 1:
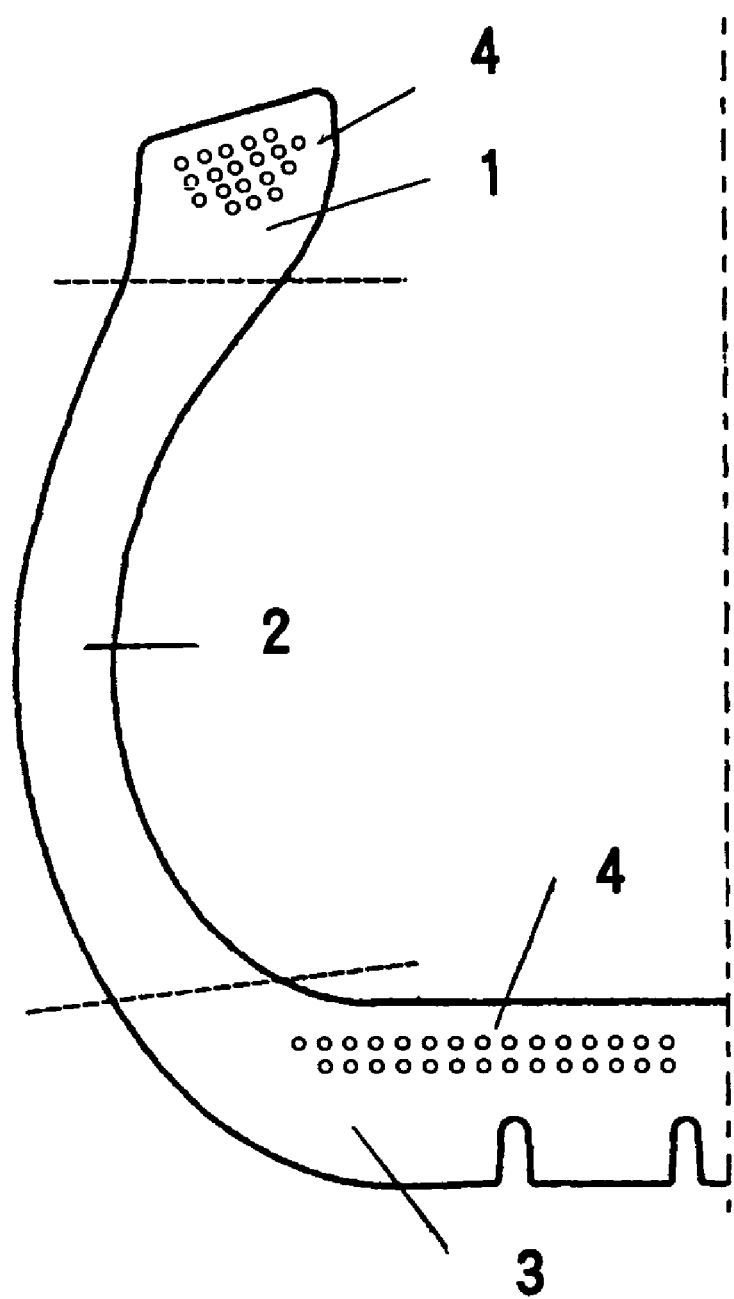
FIG. 1 is an illustrative view showing the constitution of a tire.
Figure 2:
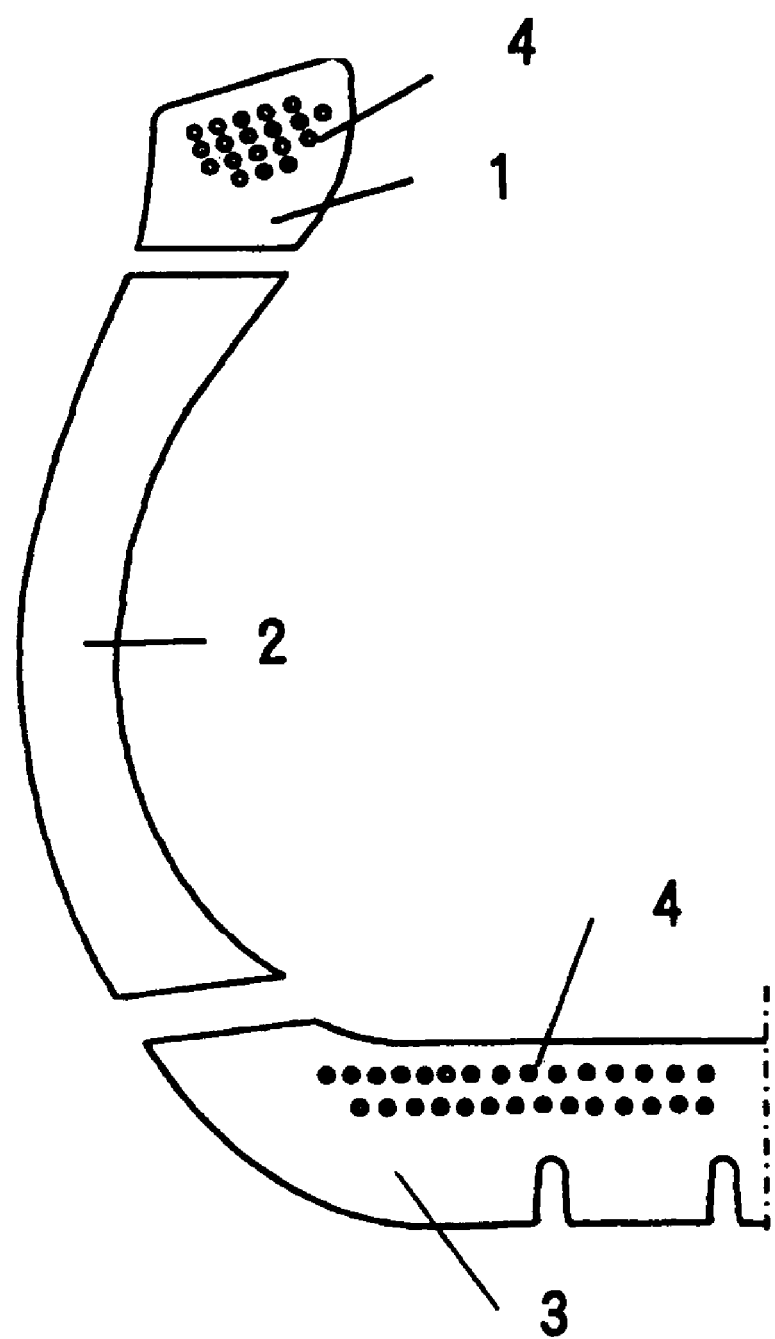
FIG. 2 is an illustrative view showing the division of the tire.
Figure 3:
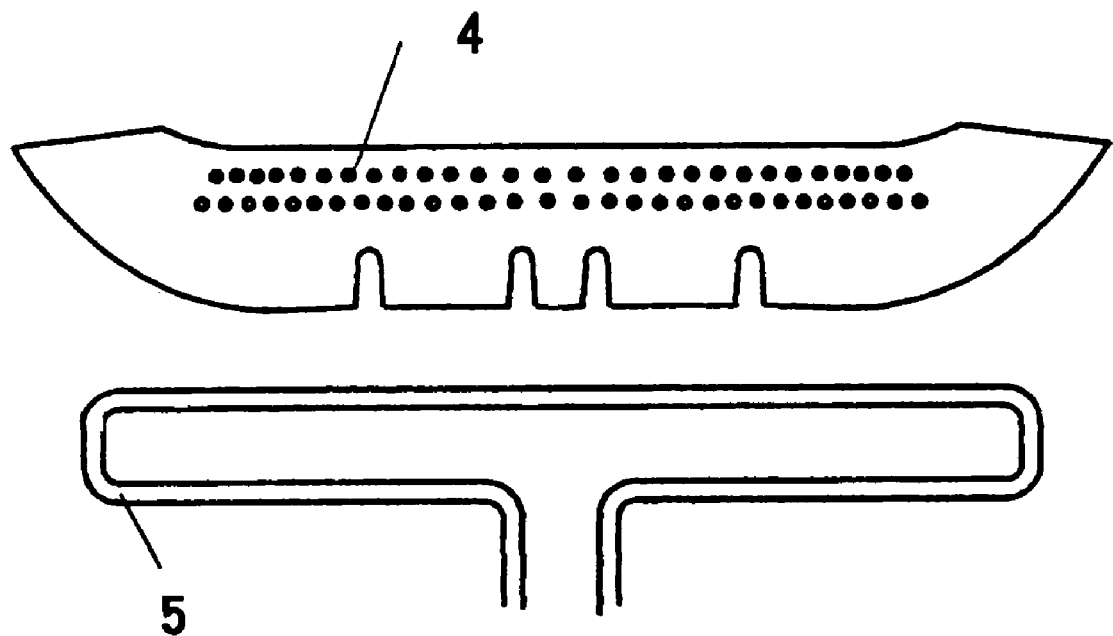
FIG. 3 is an illustrative view showing high frequency heating of a tread portion.
Figure 4:
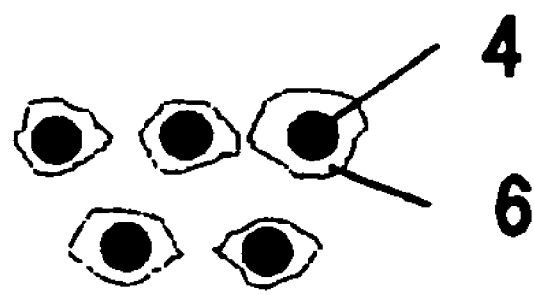
FIG. 4 is an illustrative view showing the creation of air gaps by induction heating.
Figure 5:
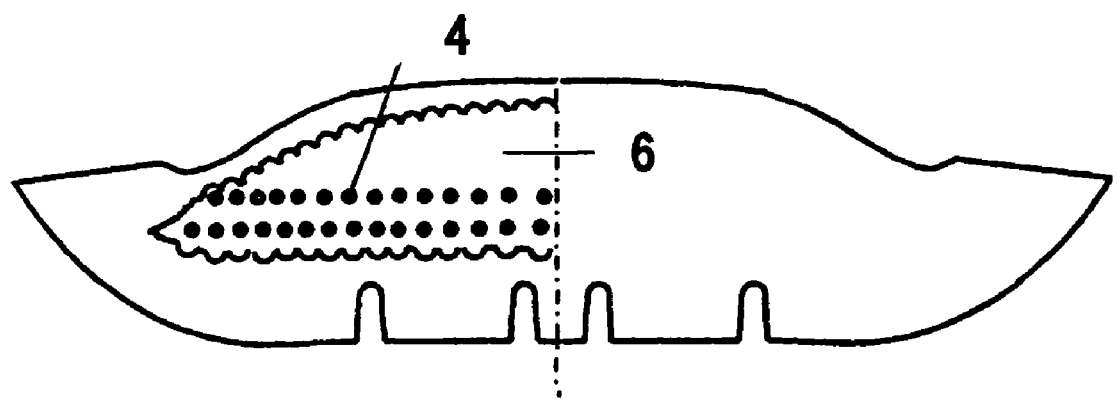
FIG. 5 is an illustrative view showing a part of the tire in the interior of the tread that is expanded into balloon form by heat application.
Figure 6:
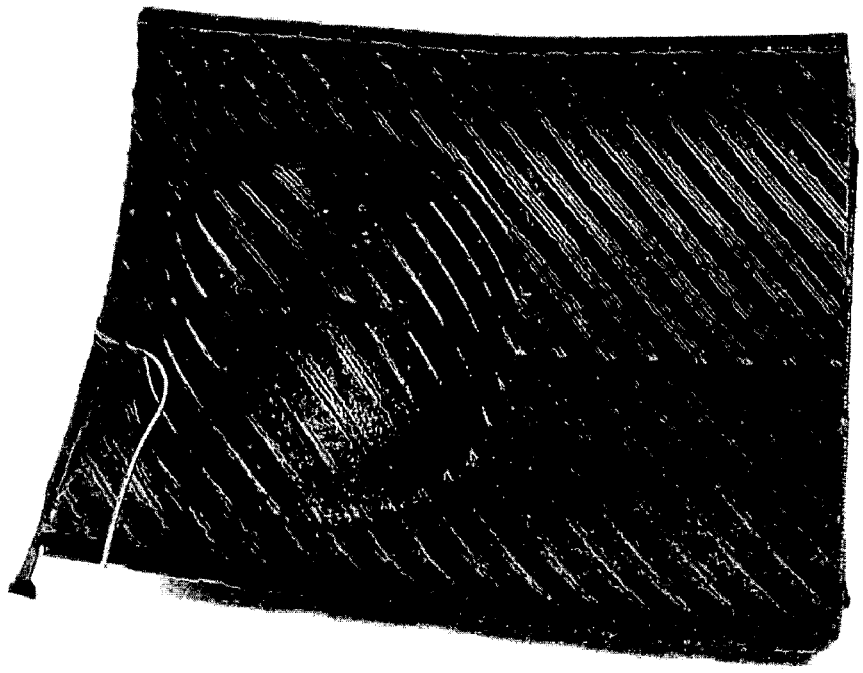
FIG. 6 is an illustrative view showing the tread portion dilated into balloon form.

FIG. 6 shows the result of induction heating applied to the extracted part of the tread portion. The employed high frequency was obtained by a device with a frequency of 50 kHz and a maximum output of 30 kw. As shown in the figure, gasification occurred from three to five seconds after the beginning of heat application, whereby the tread portion dilated into balloon form toward the inside of the tread portion. The temperature of the rubber part at this time, which was measured by inserting a thermo couple into the rubber part near the steel wires, was 117° C., and it was learned that this is a temperature at which the rubber part other than the steel wires does not burn or change in nature due to the applied heat. In consideration of the heating period and applied power, it is believed that dilation into balloon form occurs at an extremely low input energy.

Figure 7:
FIG. 7 is an illustrative view showing steel wires separated from a rubber base.
Figure 8:
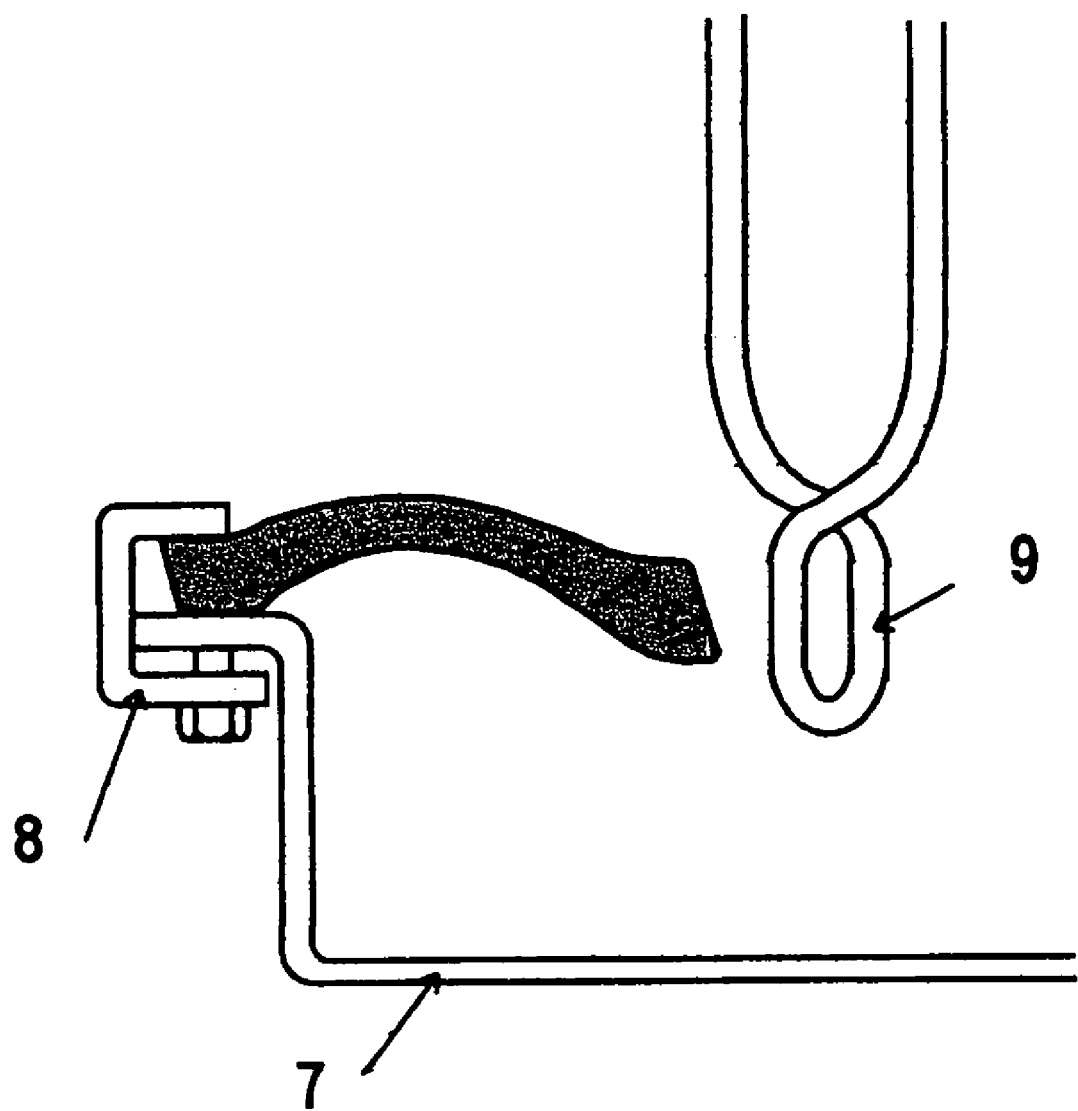
FIG. 8 is an illustrative view of a device for attaching a sidewall portion and bead portion to a rotary disk to perform induction heating using a high frequency coil.

FIG. 7 shows the interior of the part of the tread portion dilated into balloon form cut open and observed. As shown in the figure, the steel wires are arranged with almost no disturbance, and the rubber on the inside part of the tread has been peeled away easily and with no resistance. It goes without saying that the steel wires on the outside part of the tread are also completely separated.

Hence by performing induction heating around the circumference of the tread portion such that the inside of the tread portion dilates into balloon form, and then cutting away the inside of the tread portion, the steel wires can be easily retrieved.

EXAMPLE 2

(1) Method

A tire of a normal passenger vehicle was cut in the circumferential direction thereof are divided into a tread portion, a sidewall portion, and a bead portion. The tire disk constituted by the sidewall portion and bead portion was placed on a disk, and the end portion of the sidewall portion was fixed by a clamp. Then, the bead wires of the bead portion were subjected to induction heating using an induction hardening device with a frequency of 400 KHz and a maximum output of 30 kw. The high frequency output at this time was set to three kilowatts, and the disk on which the sidewall portion and bead portion were placed was rotated at a velocity of 3 rpm. The bead wires of the bead portion were subjected to induction heating by positioning a high frequency coil in the vicinity of the bead portion.

Figure 9:
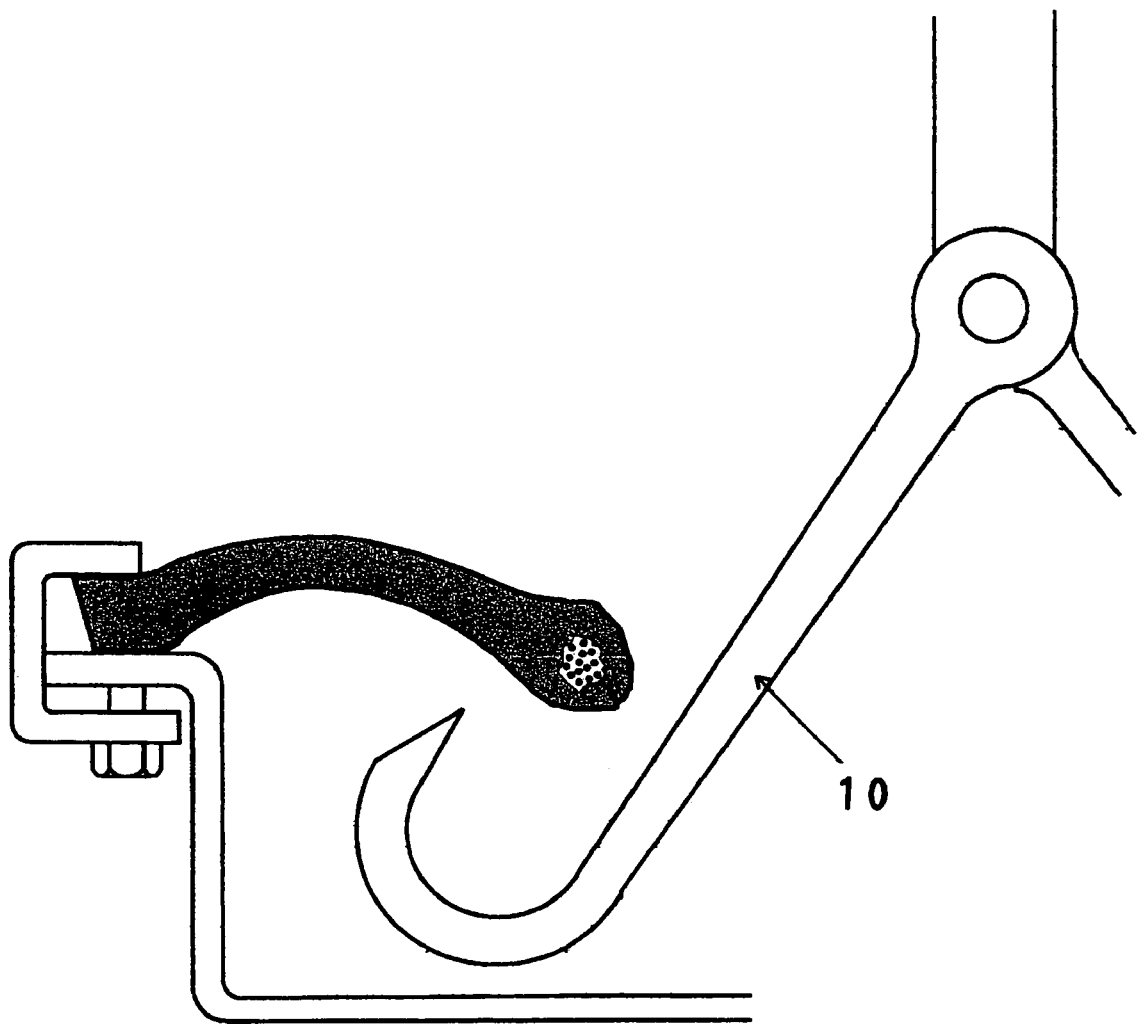
FIG. 9 is an illustrative view of a device for producing air gaps in a wire portion by means of induction heating, and for extracting bead wires using latching means comprising a hook.
Figure 10:
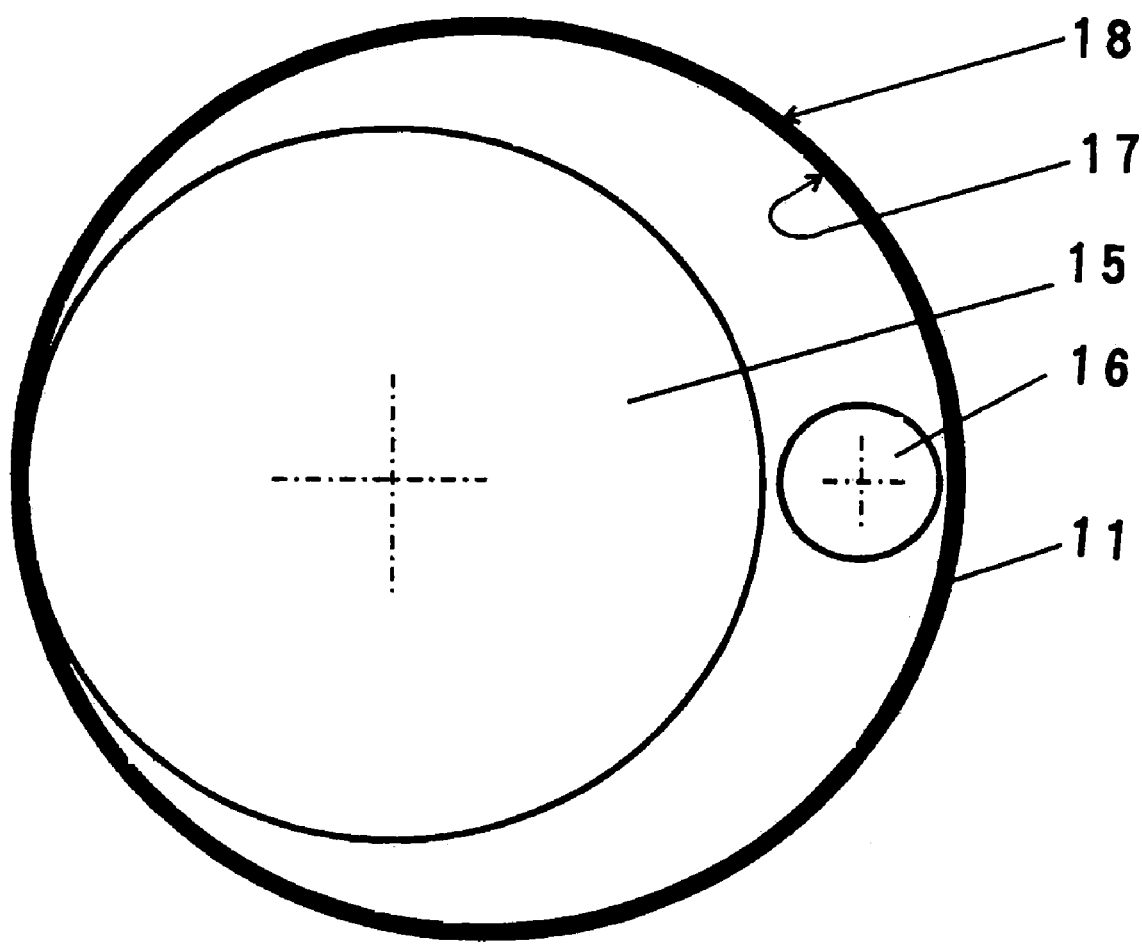
FIG. 10 is an illustrative view showing an example of a method for inverting a tire such that the tire is turned inside out, and attaching the tire to a pair of rollers comprising a driven roller and a moving roller.
Figure 11:
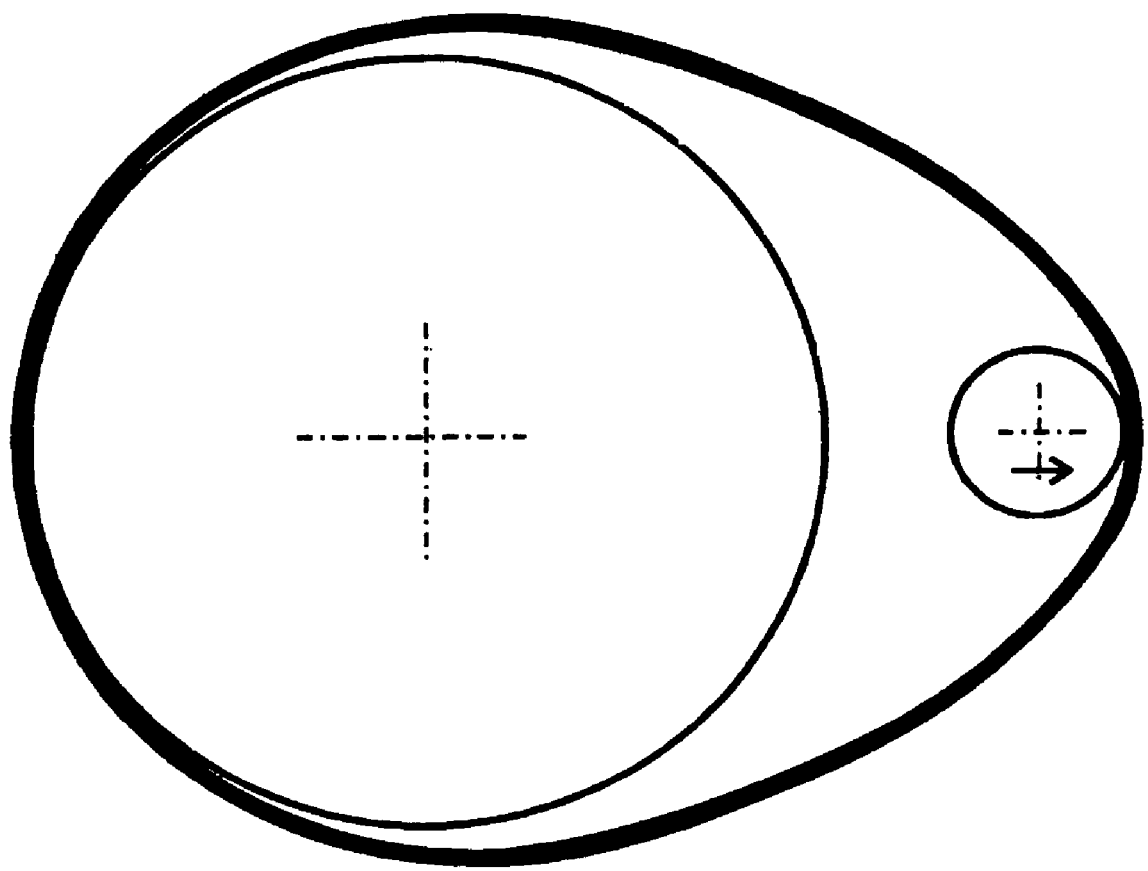
FIG. 11 is an illustrative view showing a method of moving the moving roller in a rightward direction such that the tread portion is stretched.
Figure 12:
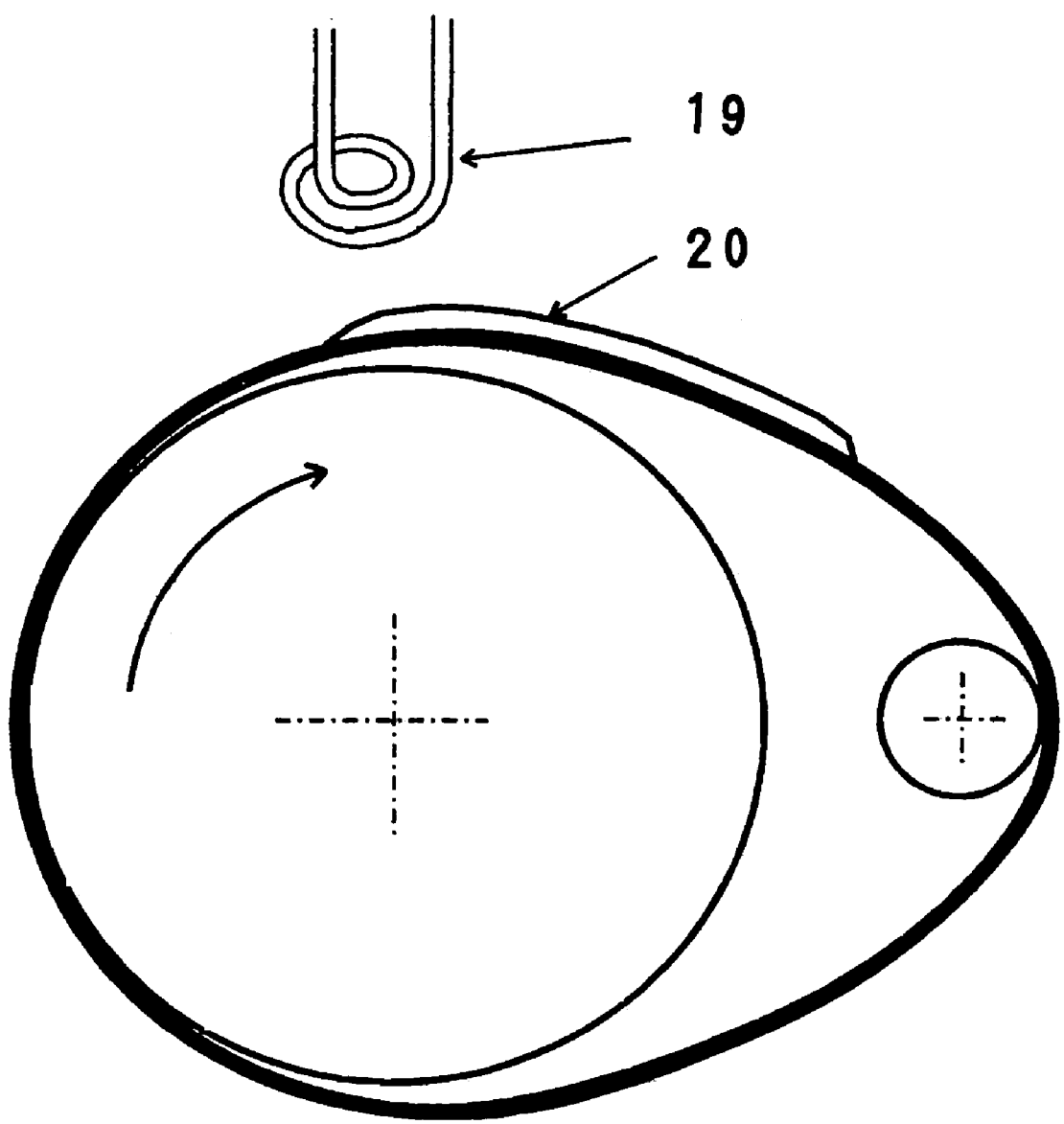
FIG. 12 is an illustrative view showing an example of a method of induction heating the tread portion while rotating the tread portion on rollers.
Figure 13:
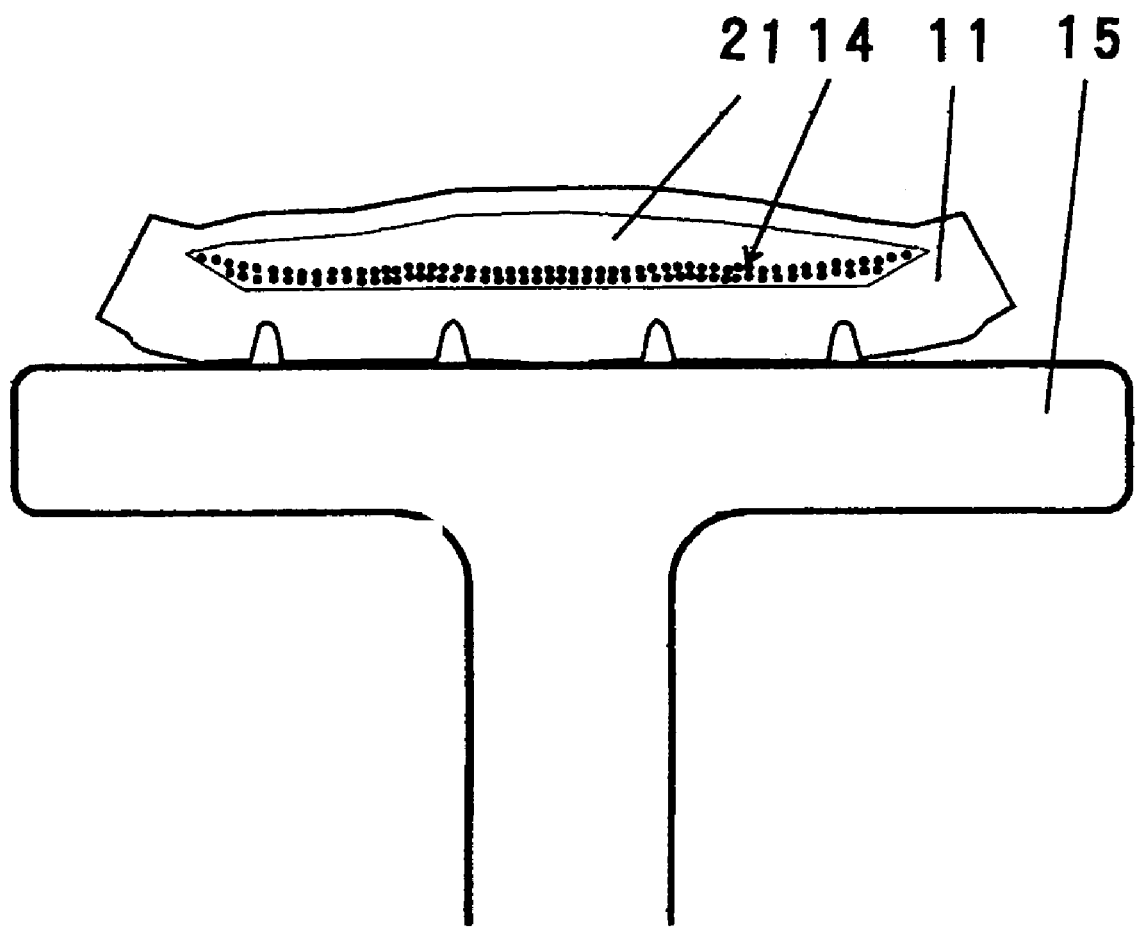
FIG. 13 is a sectional view showing the part of the tread portion that is caused to dilate into balloon form through heat application to form a cavity.
Figure 14:
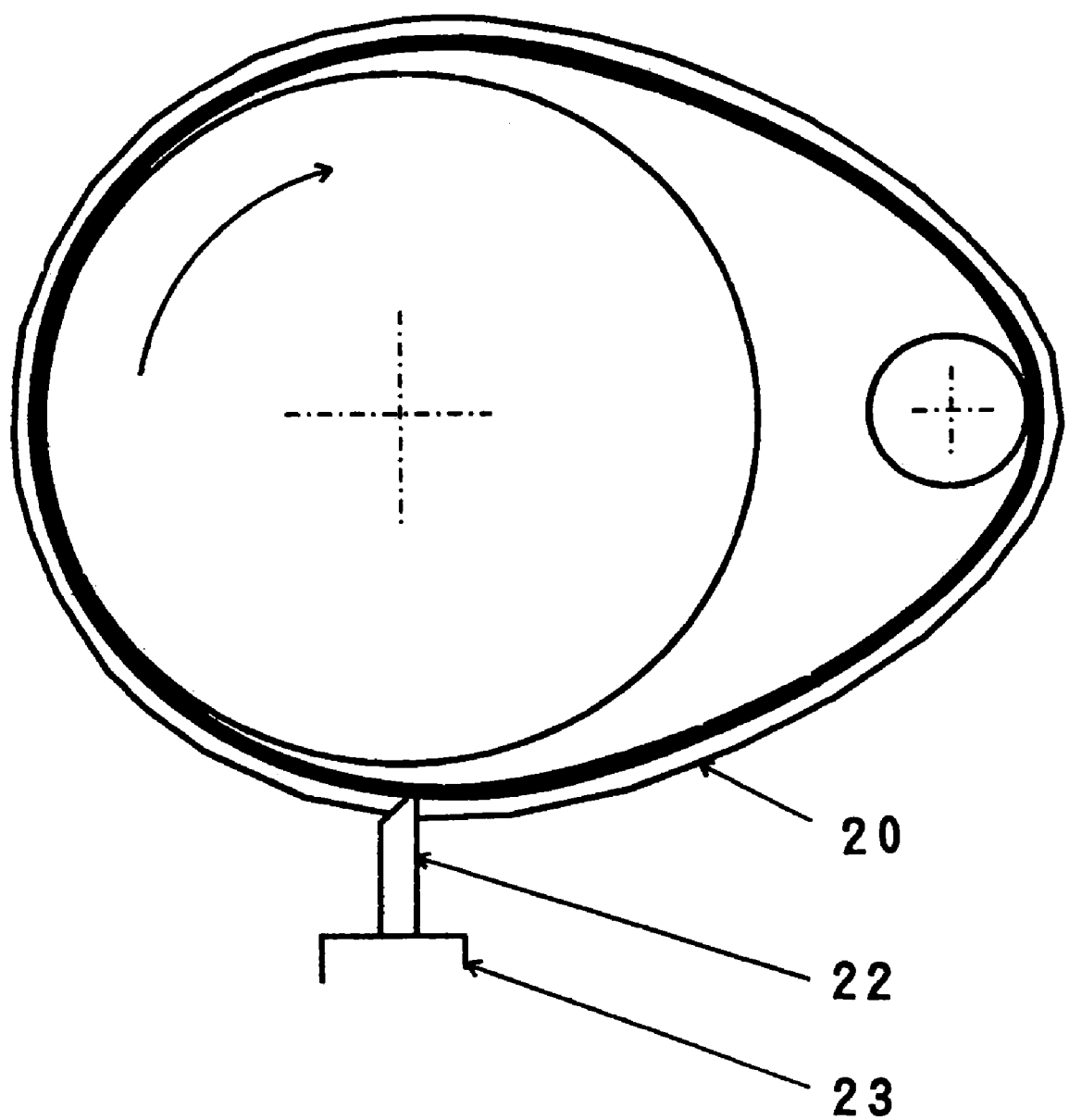
FIG. 14 is an illustrative view showing an example of a method of cutting into the balloon-form dilated part using a cutter.
Figure 15:
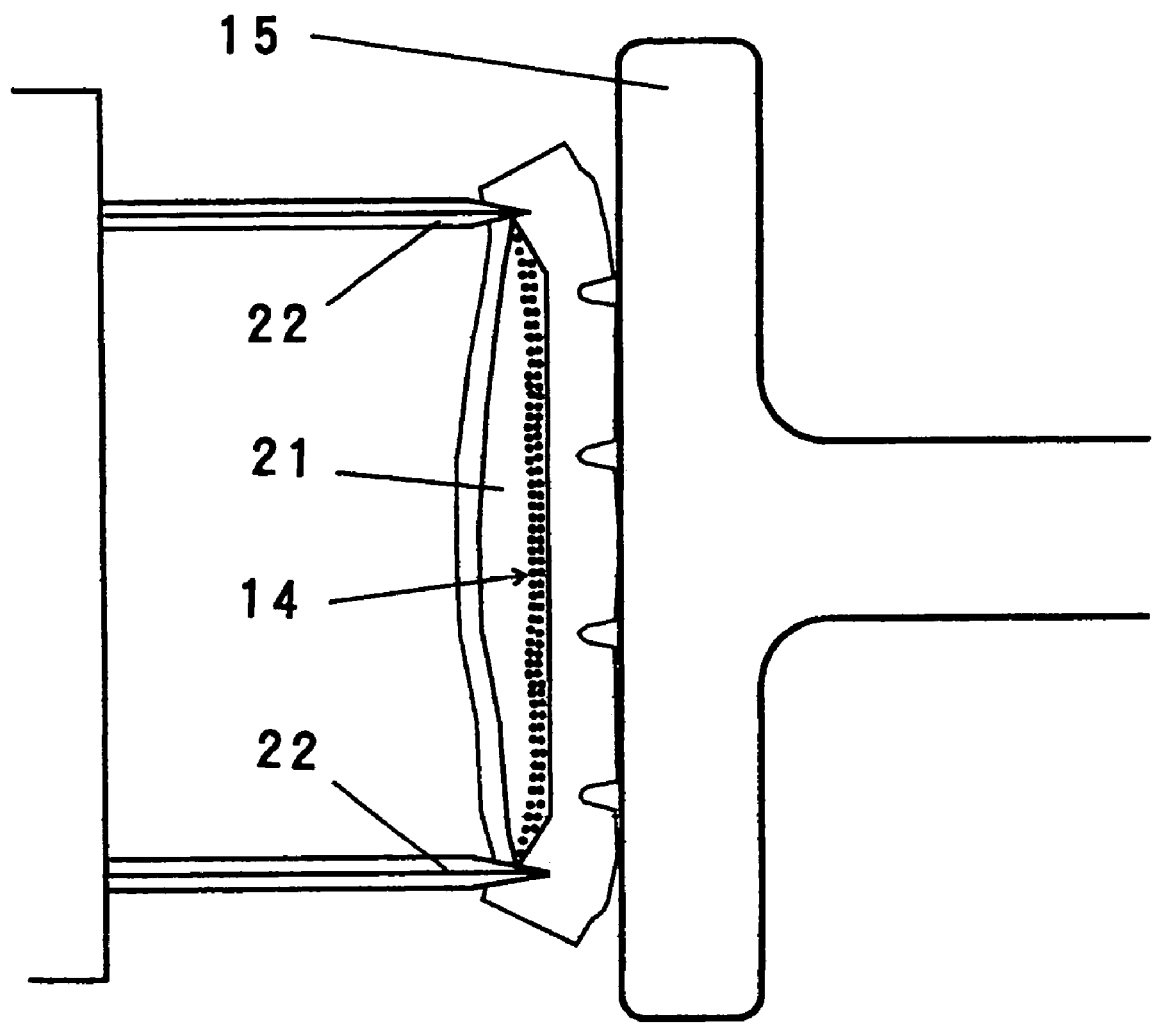
FIG. 15 is a sectional view showing a method of cutting into both ends of the dilated part of the tread portion using two cutters.

By means of this induction heating, the rubber of the part contacting the bead wires was caused to decompose and gasify, whereby the bead wires and the rubber part were separated. Next, a hook of latching means having a forked hook as shown in FIG. 9 was inserted below the tire disk, and by moving the hook upward, the distal end of the hook was caused to pierce the bead portion. By moving the hook further upward, the rubber portion covering the bead portion was torn away, whereupon the bead wires were extracted, and thus the bead wires and rubber part were separated and collected. The rubber part was then cut and shredded according to a normal method and reused as pavement material or the like.

(2) Result

In the method described above, gasification of the rubber of the part contacting the bead wires occurs immediately after the beginning of induction heating of the bead wires, causing the bead portion to dilate into balloon form toward the inside of the bead portion. The temperature of the rubber part at this time, which was measured by inserting a thermo couple into the rubber part near the bead wires, was 136° C., and it was learned that this is a temperature at which the rubber part other than the bead wires does not burn or change in nature due to the applied heat.

Further, by latching the bead portion using the latching means described above, the rubber of the inside part of the bead can be peeled away easily and with no resistance, enabling the bead wires to be extracted.

It was also learned that by performing induction heating around the circumference of the bead portion such that the inside of the bead portion dilates, and then latching the bead portion using the latching means, the rubber part can be cut away easily, enabling the bead wires to be extracted.

As described above in detail, the present invention relates to a method of removing metal wires from a tire by applying induction heating such that the metal wires in the tire are heated and the rubber of the part contacting the metal wires is decomposed and gasified, as a result of which the metal wires and rubber part separate and the metal wires can be removed. According to the present invention, the following particular effects are obtained: (1) metal and rubber can be separated at high speed, low energy, without severing the steel wires using a cutter, and with an extremely small region of alteration in the obtained rubber; (2) metal wires can be removed from a tire efficiently and by a simple operation; (3) the metal wires and rubber portion of a used tire can be separated and collected at a high collection rate; and (4) the metal wires and rubber part collected from the used tire can be reused as metal and rubber resources.

What is claimed is:

1. A bead wire removal method from the tire incorporated with a bead portion characterized in that a disk form sidewall portion and a bead portion separated from a tire are placed onto rotatable fixing means which rotates on a plane and fixed thereby, the bead wires in the bead portion are subjected to induction heating while the fixing means is rotated, the rubber portion covering the bead portion is latched by latching means and cut away, and then the bead wires are separated from the bead portion.

2. The bead wire removal method according to claim 1, wherein the rubber portion covering the bead portion is latched by latching means having a hook with a pointed distal end to cut the rubber away, and then the bead wires are extracted from the bead portion.

3. The bead wire removal method according to claim 1, wherein the fixing means is a disk.

4. The bead wire removal method according to claim 3, wherein the disk rotates on a horizontal plane.

5. A bead wire removal device for removing bead wires from a tire comprising a bead portion, comprising: fixing means which rotates on a plane for fixing a tire comprising a bead portion by placing the disk form sidewall portion and the bead portion separated from the tire thereon; induction heating means for heating the bead wires in the bead portion while the fixing means is rotated; and latching means for latching and cutting away the rubber portion covering the bead portion to separate the bead wires from the bead portion.

6. The bead wire removal device according to claim 5, wherein the fixing means is a disk.

7. The bead wire removal device according to claim 6, wherein the disk rotates on a horizontal plane.

8. A steel wire removal method for removing steel wires from a tread portion of a tire, comprising the steps of: (1) separating a part comprising the tread portion from the tire; (2) inverting the inner face and outer face of said tread portion such that said tread portion is turned inside out; (3) fixing the inverted, inside-out tread portion by positioning it on the outside of a pair of rollers; (4) subjecting said inside-out tread portion to induction heating while it is rotated; (5) cutting open the part which is dilated by said induction heating; and (6) removing said steel wires, wherein the pair of rollers includes a driven roller and a moving roller configured to receive the inverted, inside-out tread portion on an outside thereof, and wherein the inverted, inside-out tread portion is subjected to inducting heating while said driven roller is rotated.

9. A steel wire removal method according to claim 8, wherein said pair of rollers includes a large roller and a small roller.

10. A steel wire removal device for removing steel wires from a tread portion of a tire, comprising: (1) pair of rollers for fixing the tread portion thereto in an inverted orientation such that an inner face thereof is turned outward and an outer face thereof is turned inward; (2) an induction heater for induction heating said tread portion while it is rotated; (3) cutting means for cutting open the part of said tread portion that is dilated by said induction heating; and (4) steel wire removal means for removing said steel wires, wherein the pair of rollers includes a driven roller and a moving roller configured to receive the inverted, inside-out tread portion on an outside thereof, and wherein the inverted, inside-out tread portion is subjected to inducting heating while said driven roller is rotated.

11. A steel wire removal device according to claim 10, wherein said pair of rollers includes a large roller and a small roller.

12. A bead wire removal method from the tire incorporated with a bead portion characterized in that a disk form sidewall portion and a bead portion separated from a tire are placed onto a fixing member which rotates on a plane and fixed thereby, the bead wires in the bead portion are subjected to induction heating while the fixing member is rotated, the rubber portion covering the bead portion is latched by a latch and cut away, and then the bead wires are separated from the bead portion.

13. The bead wire removal method according to claim 12, wherein the fixing member is a disk.

14. The bead wire removal method according to claim 13, wherein the disk rotates on a horizontal plane.

15. The bead wire removal method according to claim 12, wherein the rubber portion covering the bead portion is latched by the latch having a hook with a pointed distal end to cut the rubber away, and then the bead wires are extracted from the bead portion.

16. A bead wire removal device for removing bead wires from a tire comprising a bead portion, comprising: a fixing member which rotates on a plane and is configure to fix thereon a tire comprising a bead portion by placing the disk form sidewall portion and the bead portion separated from the tire thereon; an induction heater configured to heat the bead wires in the bead portion while the fixing member is rotated; and a latch configured to latch and cut away the rubber portion covering the bead portion to separate the bead wires from the bead portion.

17. The bead wire removal device according to claim 16, wherein the fixing member is a disk.

18. The bead wire removal device according to claim 17, wherein the disk rotates on a horizontal plane.

* * * * *